ERROR DETECTION AND CORRECTION CIRCUITS

Filed Sept. 30, 1963 2 Sheets-Sheet 1

INVENTOR
WILLIAM F. SIMON

BY Edward M. Farrell
ATTORNEY

3,331,051
ERROR DETECTION AND CORRECTION CIRCUITS

William F. Simon, Oreland, Pa., assignor to Sperry Rand Corporation, New York, N.Y., a corporation of Delaware Filed Sept. 30, 1963, Ser. No. 312,644
8 Claims. (Cl. 340—146.1)

This invention relates to error detection circuits used with information recovery from fixed frequency phase modulated digital recordings; and more particularly to circuits for correcting the error condition when detected.

Phase modulation, as applied to digital recording, is a technique whereby the binary digits (ONE or ZERO) representing the digital information to be recorded are stored in the form of pulse doublets of opposite phases. Each pulse doublet will be in the maximum positive signal condition for one half its period, and will be in the maximum negative signal condition for the other half period. A positive half period followed by a negative half period represents one of the binary states; a negative half period followed by a positive half period represents the other binary state. To simplify discussion, let us assume ONE is represented by a pulse doublet which is first positive and then negative; ZERO must then be represented by a pulse doublet which is first negative and then positive. Note that the information content may be regarded as expressed by the "significant" transient (from positive to negative for ONE; from negative to positive for ZERO) which always occurs at the mid-point of the pulse doublet. If a data pattern of alternating ONES and ZEROS is recorded, there are no other transients. But when the data pattern contains two sequential ONES (or two sequential ZEROS) an additional transient must be introduced between the two bits. This is necessary because each "significant" transient traverses the entire range of signal amplitude, and can be repeated only by restoring the original signal condition. The chief problem of information recovery, in such a system, is that of distinguishing the "significant" transients which occur in every pulse doublet from the "non-significant" transients which occur only to restore the original signal conditions between two pulse doublets of the same phase. It must be noted that both "significant" and "non-significant" transients are uniquely determined by the data pattern, and that this redundancy makes possible the self-checking features of this mode of recording.

When the information is recovered from the recording medium, means must be employed to identify the non-significant transients in order that the phase sense of a train of pulse doublets be known. Some such means employed in the past to identify these non-significant transients have included circuits to generate an inhibit signal for a duration of three quarters of a bit period. Generally, such a circuit has been arranged to be triggered by the "significant" transients and to inhibit any response for three quarters of a bit period thereafter. This necessarily includes the time of the "non-significant" transients.

If, however, the means for causing the inhibit signal to be generated by a "significant" transient should momentarily fail, the inhibit signal may become phased to the "non-significant" transients for a period of time dependent on the data pattern and the controlling circuits employed. Such a momentary failure may be caused by a single bit incorrectly timed, or by a noise transient, or by other momentary conditions not reflecting component failures. The effects upon recovered information are to invert the sense of an indeterminate number of bits and often to reduce the total number of bits recovered. Both effects are affected by the data pattern originally recorded in any of the several systems of information recovery employed to date.

Since the number of bits recovered may be affected by the momentary failure, various parity checking techniques are ineffective unless externally clocked. Generally phase modulation has been used in a self-clocking system where skew problems presented by external clocking are intolerable. A different means of checking has therefore been devised.

It is an object of this invention to provide an improved information recovery system for phase modulated recording, by which error conditions are detected and corrected.

It is a further object of this invention to provide a circuit for positive error detection and to prevent the error from being extended through an indeterminate portion of the recovered information.

It is a further object of this invention to indicate the exact bit at which an error condition is corrected, which bit is always correctly transmitted to subsequent circuits of the system.

It is a further object of this invention to reduce the number of bits required in the record when stored, by virtue of eliminating check bits.

It is a further object of this invention to make practical the recording and/or transmission of data in bit serial mode with minimal bandwith requirements but retaining the reliability basic to digital systems.

In accordance with the present invention, an error detection and correction system for a phase modulation system is provided. Information pulse signals are combined in a first set of circuits. Non-significant pulse signals are combined in a second set of circuits. Whenever the time interval between two non-significant pulse signals is of such a characteristic to indicate an error, an error signal is generated and utilized to change the phase of the signals being read thereby providing a correction signal.

Other objects and advantages of the present invention will be apparent and suggest themselves to those skilled in the art, from a reading of the following specification and claims in which:

Figure 1:
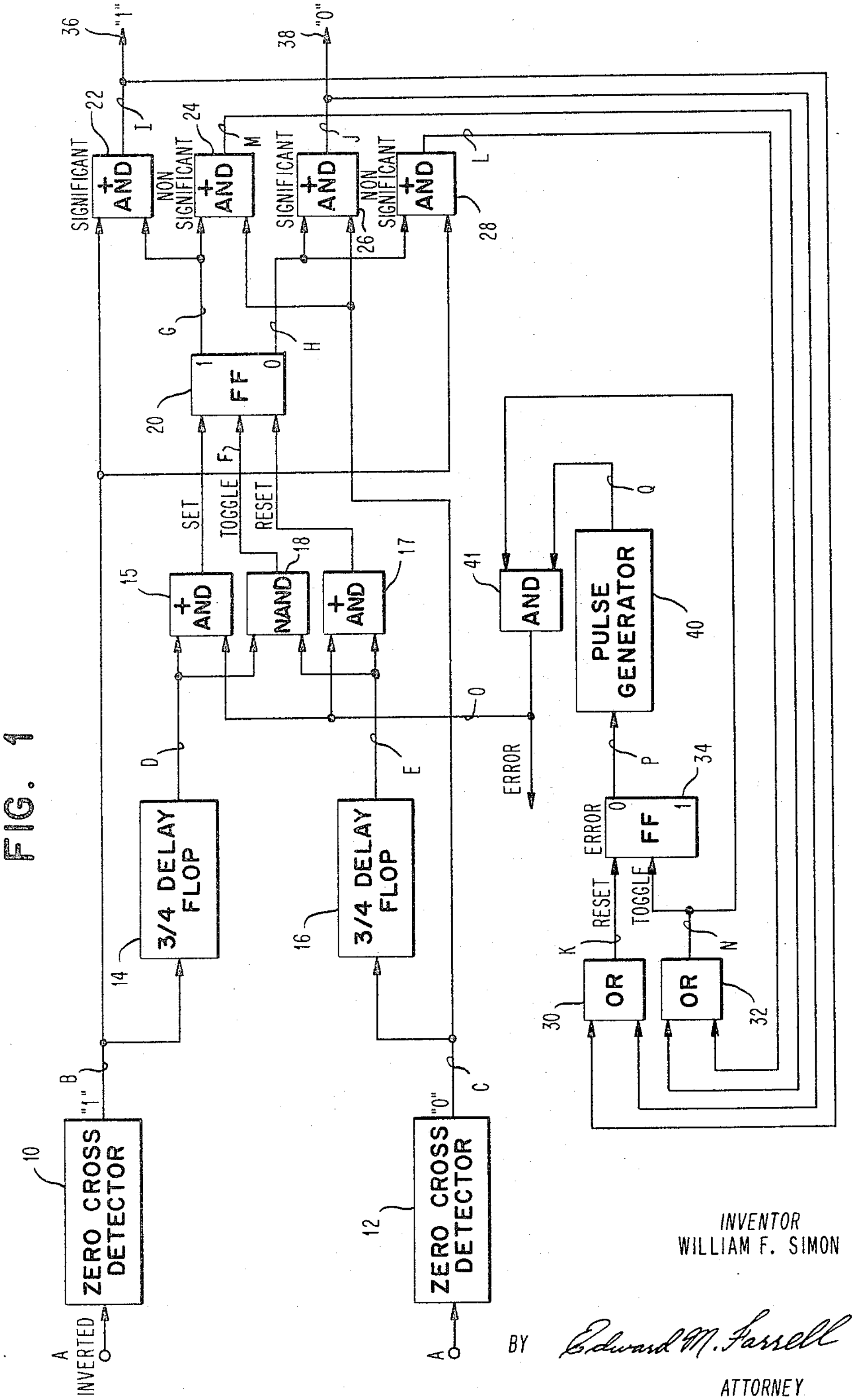
FIGURE 1 is a block diagram illustrating one form of the present invention.
Figure 2:
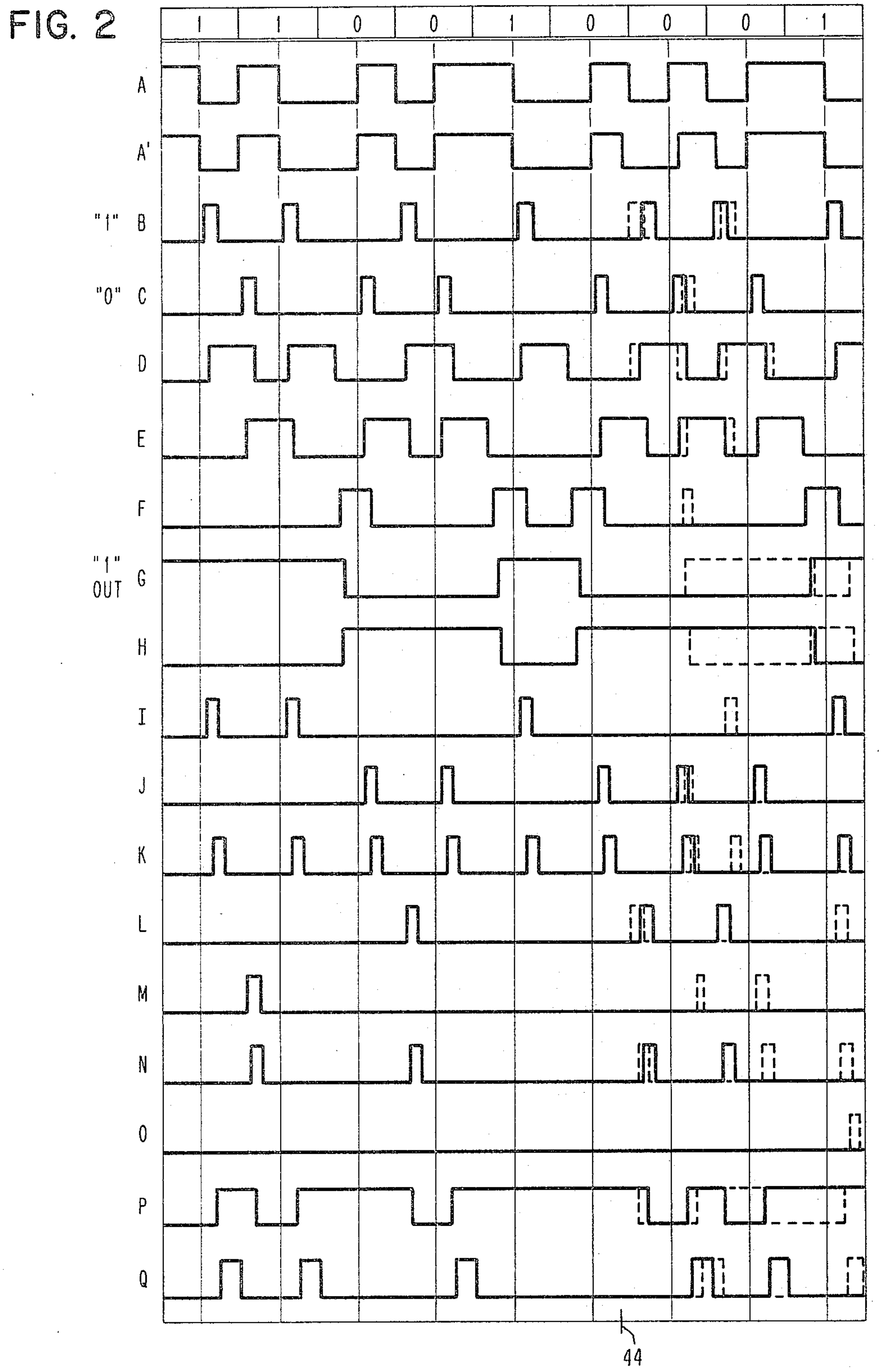
FIGURE 2 illustrates a series of waveforms, shown for purposes of explanation.

Referring to FIGURES 1 and 2 of the drawing, a signal represented by waveform A is applied to a pair of zero cross detectors 10 and 12. The signals applied to the zero cross detectors 10 and 12 are opposite in phase. The zero cross detector 10 may be considered as the circuit which detects pulse doublets representing ONES. The zero cross detector 12 may be considered as the circuit for detecting pulse doublets representing ZEROS. Such zero cross detectors may be, for example, Schmitt Trigger circuits with differentiated output, as is well known to those skilled in the art. Such circuits have the characteristic of generating an output pulse signal whenever the input signal passes from a negative value to a positive value through zero. These circuits respond only to transients in one direction. They can not, however, distinguish "significant" transients (which occur in every pulse doublet) from "non-significant" transients (which occur only to restore the original signal conditions between two pulse doublets of the same phase).

A series of output pulse signals from zero cross detector 10, represented by waveform B, are generated from significant transients of pulse doublets representing ONES or from non-significant transients between pulse doublets representing ZEROS. Similarly, the pulse signals from the zero cross detector 12, represented by waveform C, are generated from significant transients of pulse doublets representing ZEROS or from non-significant transients between pulse doublets representing ONES. Output pulse signal from zero cross detector 10 are applied to trigger delay flop 14; output pulse signals from zero cross detector 12 are applied to trigger delay flop 16. Each of these is designated as a "¾ delay flop" because it is designed to recover after a time interval equal to ¾ of the nominal bit period.

The output signals from the three quarter delay flops 14 and 16 are represented by waveform D and E, respectively. They are applied to an NAND circuit 18. The NAND circuit 18 has the characteristic of generating a positive output signal whenever the two input signals from the delay flops 14 and 16 are at a low level. As long as one of the three quarter delay flop circuits 14 and 16 has a positive output level, a negative output signal is generated by the NAND circuit 18. Waveform F represents the output signals of circuit 18 when waveforms D and E are its inputs.

A positive output signal from the NAND circuit 18 is applied to the "toggle" input of flip-flop circuit 20. The flip-flop circuit 20 has the characteristic of changing operating states each time a positive signal is applied to its "toggle" input circuit. It may also be set or reset, in the conventional manner, when positive signal is applied to its set or reset inputs.

The flip-flop circuit 20, having a pair of output terminals designated "1" and "0," produces output signals represented by waveforms G and H, respectively. The "1" side of flop-flop circuit 20 is applied to an AND gate circuit 22, which is designated as being a significant AND gate circuit, and to an AND gate circuit 24, which is designated as being a non-significant AND gate circuit.

The "0" output terminal of flip-flop 20 is applied to an AND gate circuit 26, which is designated as a significant AND gate circuit and to an AND gate circuit 28, which is designated as a non-significant AND gate circuit.

If the output pulse signal from zero cross detector 10, represented by waveform B, is applied to the AND gate circuit 22 when the "1" side of the toggle flip-flop 20 is positive (see waveform G), then the pulse signal will pass through AND gate circuit 22 and be applied to an OR gate circuit 30. This signal is represented by waveform I.

If the output pulse signal from the zero cross detector 12, represented by waveform C, is applied to the AND gate circuit 26 when the "0" output terminal of the flip-flop 20 is high (see waveform H), then this pulse will pass AND gate circuit 26 and be applied to the OR gate circuit 30. This latter signal is illustrated by waveform J.

The pulse signals normally representing significant information are combined in the OR gate circuit 30 to produce output signals represented by waveform K.

In a similar manner, the AND gate circuit 24 will permit a signal to pass therethrough when an output pulse signal from the zero cross detector 12 is applied thereto while the "1" output terminal of the flip-flop 20 is high. Under these conditions, the AND gate circuit 24 produces a signal represented by waveform M which is applied to an OR gate circuit 32.

In a similar manner, if a pulse signal from the zero cross detector circuit 10 is applied to the AND gate circuit 28 while the "0" output terminal of the flip-flop 20 is high, a signal, represented by waveform L, will be applied to the OR gate circuit 32. The OR gate circuit 32 normally serves to combine the non-significant pulse signals of waveform L and M to produce signals represented by waveform N. The output signals from the OR gate 30 acts to reset an error flip-flop circuit 34. The signal from the OR gate circuit 32 acts to toggle the error flip-flop 34, whose circuit is similar to flip-flop circuit 20.

Pulse generator circuit 40 differentiates the "0" output of flip-flop circuit 34 to provide a pulse each time the "0" state is established. Normally this occurs when a significant pulse resets the flip-flop. If ever the "0" state is established by two sequential toggle inputs, the coincidence of a toggle input and an output from the pulse generator will be detected in AND gate circuit 41, whose output is represented by waveform O. This signal provides an error indication and also a means of correcting the state of flip-flop circuit 20, via NOR circuits 15 and 17.

The success of error detection by flip-flop circuit 34 is dependent on the redundancy of the recorded waveform. The non-significant transients of the waveforms are always between two significant transients. Significant transients, on the other hand, frequently occur with no interviewing non-significant transient (at every change in data content from ONE to ZERO, or vice versa). In effect, circuit 34, counts the number of sequential pulses interpreted as non-significant. Pulses interpreted as significant reset the count to zero. If the non-significant count ever exceeds one, the information recovery system has an error. Moreover, the error will be detected at the time of a significant pulse and at a time when only one "¾" delay flop has not recovered. These features enable flip-flop circuit 34 to check the performance of circuits 14, 16, 18, and 20 every time the data content changes from ONE to ZERO, or vice versa, and—with the aid of circuits 40 and 41—to generate an error signal whose timing is such that the error conditon may be corrected as soon as detected.

As noted earlier the chief problem of information recovery in the system under discussion is that of distinguishing "significant" transients from "non-significant" transients. The error condition to be detected is that in which flip-flop circuit 20 has become out-of-phase with data, gating non-significant pulses into the significant pulse circuits and vice versa. Note that only the flip-flop circuits 20 and 34 have "memory" of events in the previous pulse period and correcting the state of flip-flop 20 will restore correct data flow. Note also that the state of flip-flop 20 will continue to change with each change of date content, maintaining a consistently incorrect data sense unless and until an error pulse appears at output terminal 42 (barring a second error). This consistency is an aid in reconstructing the original data after an error occurs.

In FIGURE 2 a solid line 44 is indicated. Up to this line going from left to right, it is assumed that no errors are in the system and that all the read out signals are correct and that the flip-flop 20 is toggled at the proper time. In the portion to the right of the line 44, it is assumed that an error in the information recovery system has occurred and that the flip-flop circuit 20 has gated non-significant pulses to the "1" and "0" data busses. This is further depicted by waveform A′ which shows an error waveform to the right of line 44. Also note that the pulse changes which result from the A′ waveform are shown in dashed lines on the other waveforms. It is known that a change in signal level must always occur at the significant portions of the signal. Failure to read information at the proper time may result in error. The error may be the result of various factors, which may include a variation in the speed of the recording medium. In the example illustrated, the change in signal levels representing the information occurs early. Whatever the cause of this error be, it is seen that in the example illustrated that the information signal changes phase at the time interval in which non-significant signals usually occur.

When this happens, signals from the three quarter delay flop circuits 14 and 16 are both low to cause an output signal from the NAND circuit 18 to toggle the flip-flop circuit 20. Signals represented at waveform F will therefore change the operating state of the flip-flop 20. If the phase of the signal from the toggle flip-flop circuit 20 is not corrected all subsequent signals will be read in the wrong phase.

The widened pulse of waveform A′ to the right of line 44 causes the signals of waveform B to start earlier and end later in response thereto as shown by the dashed lines on waveform B. It also causes the C pulse in that time area to start later as shown by the dashed lines. It follows that if the B pulses start earlier and ends later, the associated D pulses will start earlier and end later and if the E pulse associated with the phase-shifted C pulse starts later. This condition provides two negative input signals to the NAND circuit 18 and accordingly provides an additional F pulse as shown on the F waveform in dashed line.

In response to the dashed line F pulse, last mentioned, the flip-flop 20 is toggled and hence the G and H pulses are shown transferred at that time as depicted by the dashed line portion of waveforms G and H.

Once the G signal becomes positive there is a response to the later developed B signal to provide an I signal which otherwise would not have occurred and this is shown by the I dashed line. The I pulse of course provides a K pulse, also shown in dashed line form, and this resets the error flip-flop 34. Now with the G signal being high the AND gate 24 is fully conditioned at the next C pulse time which provides the second M pulse in dashed line form. The M pulse dashed line form of course generates the N pulse, shown in dashed line form, and this toggles the error flip-flop to its ONE side hence providing a high ZERO signal to the pulse generator 40.

Now assuming that the information signal has lapped back into its proper timing there will be a negative D and E signal formed at about their proper time to generate the usual F signal and hence the flip-flop 20 will be toggled once again. However when the flip-flop 20 is once again toggled the G and H signals will be different from what they had been under normal operations as can be seen from the dashed line and hence the H signal will be conditioning the AND gate 28. Accordingly when the next B signal comes along the AND gate 28 will be fully conditioned to generate an L signal. The L signal is shown in dashed line form and it once again toggles the error flip-flop 34. It will be recalled that if the error flip-flop 34 is toggled twice in succession without being reset that the AND gate 41 will become fully conditioned to generate the O pulse. The O pulse is the error signal and it properly conditions the AND gates 15 and 17 to set or reset the flip-flop 20 into its proper form so that once again the system will operate as it should.

It is noted that the error pulse illustrated in waveform O acts to correct the phase of the toggle flip-flop circuit 20. Thus, while the system unavoidably accepts a single error, the error is detected and all the subsequent information is acceptable or usable. Waveform P and Q shows that "0" output of the error flip-flop (circuit 34) and the pulse generator (circuit 40).

To simplfy the illustration, means to prolong the error pulse (which would be limited in pulse width to the reaction time of the circuits) have been omitted. In practice such means have been employed; also certain signal inversions not essential to the system performance have been omitted.

The embodiments of the invention in which an exclusive property or privilege is claimed are defined as follows:

1. A phase modulation read out circuit to be used with a source of signals which provides information pulse signals and non-significant pulse signals, comprising a controllable circuit, a signal generator for generating a gating signal which has one of two phases of the signals from said source of signals, means for applying pulse signals from said source to said controllable output circuit, means for applying said gating signal to said controllable output circuit, said gating signal normally being of the phase, to direct the passage of information signals along at least one channel and to direct the passage of said non-significant pulses along at least another channel, means for developing an error signal whenever two pulse signals from said source are detected as two consecutive non-significant pulse signals, and means for applying said error signal to said signal generator to correct the phase of said gating signal.

2. A phase modulation read out circuit, to be used with a source of information signals and non-significant signals, means for converting said information signals into a series of pulse signals representing said information and said non-significant pulse signals, a controllable output circuit, means for generating a gating signal from said pulse signals, means for applying said series of pulse signals to said controllable output circuit, means for applying said gating signal to said controllable output circuit to direct the passage of information signals along a first channel and to direct the passage of said non-significant pulses along a second channel, means for storing said non-significant pulse signals, and means for developing an error signal whenever any two of said pulse signals are detected as two consecutive non-significant pulse signals.

3. A phase modulation read out circuit, to be used with, a source of information signals, comprising means for converting said information signals into a series of pulse signals representing said information and including non-significant pulse signals, a controllable output circuit, means for generating a gating signal the phase of said gating signal being generated by said information signals in a first mode of operation, the phase of said gating signal being controlled by said non-significant pulses in a second mode of operation, means for applying said series of pulse signals to said controllable output circuit, means for applying said gating signal to said controllable output circuit to normally direct the passage of information signals along at least one channel and to direct the passage of said non-significant pulses along at least a second channel, means for storing said non-significant pulse signals, means for developing an error signal whenever two of said pulse signals are detected as two consecutive non-significant pulse signals, and means for applying said error signal to correct the phase of said gating signal.

4. An error detection and correction circuit for use with a source of signals, said signals including information pulse signals of two different types and non-significant signals which occur between every two information signals of the same type, a gating circuit, an output circuit, means for applying said signals from said source through said gating circuit to said output circuit, a control source for generating signals of two different phases, means for applying signals from said source of signals to said control source to produce a signal of one or the other phase, means for applying signals from said control source to said gating circuit to normally direct said information pulse signals along at least one channel and to direct said non-significant pulses along at least a second channel, and means for correcting the phase of said signal from said control source whenever two signals from said source are detected as two consecutive non-significant pulses.

5. In a phase modulation read out circuit, an error detection and correction circuit to be used with a source of information pulse signals of two different types and non-significant pulse signals occurring between every two information pulse signals of the same type, a gating circuit, means for applying said pulse signals from said source to said gating circuit, a control source for generating signals of two different phases, means for applying signals from said source of signals to said control source to produce a signal of one or the other phase, means for applying signals from said control source to said gating circuit to normally direct said information pulse signals along one channel and to direct said non-significant pulses along a second channel, means for detecting any two pulses which are detected as two consecutive non-significant pulse signals to generate an error signal in response thereto, means for correcting the phase of said signal from said control source whenever an error signal is generated.

6. In a phase modulation read out system, an error detection and correction circuit to be used with a source of signals, said signals including information pulse signals of two different types and non-significant pulse signals which occur between every two information signals of the same type, comprising a gating circuit, an output circuit, means for applying said signals from said source through said gating circuit to said output circuit, a toggle flip-flop circuit for generating signals of two different phases, means for applying signals from said source of signals to said toggle flip-flop circuit to produce a signal of one or the other phase, means for applying signals from said toggle flip-flop circuit to said gating circuit to direct said information pulse signals along a first channel to said output circuit and to direct said non-significant pulses along a second channel when a signal of the correct pulse is produced at said toggle flip-flop circuit, means for detecting when any two pulses are detected as two consecutive non-significant pulse signals to produce an error signal, and means for applying said error signal to said toggle flip-flop circuit to correct the phase of said signal from said toggle flip-flop circuit.

7. In combination with a source of information and non-significant pulse signals, a signal generator for generating a control signal having alternately one of two phases, a gating circuit, means for applying said information pulse signals and said control signal to direct said information pulse signals along one channel and to direct the passage of said non-significant pulse signals along a second channel when said control signal in one of the said two phases, means for applying signals from said source to normally maintain said signal generator in synchronization with said information pulse signals to produce control signals of alternatively in one of said two phases, means for storing two consecutive information pulse signals, means for storing the result of detecting any two of said signals as two consecutive non-significant pulse signals to thereby indicate that said signal generator is generating a signal of the wrong phase, means for producing an error signal whenever there is a detecting of two consecutive non-significant pulses occur, and means for applying said error signal to said signal generator to toggle said signal generator and restore the output signal therefrom to its proper phase.

8. A read out circuit for detecting and correcting for errors in phase modulation system comprising a source of information representing "1" and "0" bits of information, means for converting said information into a series of pulse signals which include two types of significant pulses representing said information and two types of non-significant pulses representing no information and which occur between two consecutive bits of information of the same type, a pair of three quarter delay flop circuits, means for applying pulses representing information and non-significant pulses of one type to set one of said three quarter delay flop circuits, means for applying pulses representing information and non-significant pulses of said other type to set the other of said three quarter delay flop circuits, an AND gate for combining the output signals from said pair of three quarter delay flop circuit to produce a pulse signal whenever two consecutive information signals are of different types and no pulse signal whenever two consecutive information signals are of the same type, a toggle flip-flop circuit having high and low output circuits, means for applying pulses from said AND gate circuit to switch the operating state of said toggle flip-flop circuit whenever two consecutive bits of information are of different types, an error detector flip-flop having toggle and reset input terminals and an output terminal adapted to be switched to either a high or low state, a first pair of AND gate circuits, means for connecting the two output circuits from said toggle flip-flop circuit to said first pair of AND gate circuits, means for applying non-significant and information pulses to said first pair of AND gates, the operating states of said toggle flip-flop circuit being such that only significant pulses normally pass through said pair of AND gate circuits with the non-significant pulses being inhibited because of the operating states of the outputs of said toggle flip-flop, an OR gate to combine the significant pulse signals from said first pair of AND gate circuits, means for applying said significant pulse signals to reset said error detector flip-flop to produce a high output at its output terminal, a second pair of AND gate circuits, means for connecting the two output circuits from said toggle flip-flop circuit to said second pair of AND gates, means for connecting said information and non-significant pulses to said second pair of AND gates, the operating states of said toggle flip-flop being such as so to permit said non-significant pulse signals to pass through said second pair of AND gate circuits and to inhibit the passage of significant pulse signals, an OR gate circuit for combining the non-significant pulses from said second pair of AND gate circuits, means for applying said non-significant pulse signals to toggle said error detector flip-flop circuit, an error AND gate circuit, a pulse generator, means for connecting the output terminal from said error flip-flop circuit to said pulse generator to produce a pulse signal, means for connecting said non-significant pulse signals to said error AND gate circuit, said error AND gate circuit producing an error output signal whenever a non-significant pulse signal and a pulse signal from said pulse generator are applied thereto, said non-significant pulse signals being inhibited when no pulse is generated by said pulse generator whereby said error signal is produced at said error AND gate circuit whenever two consecutive signals are applied to the line having non-significant pulses, and means for applying said error signal to said toggle flip-flop to switch it so as to correct for an error in the system.

References Cited

UNITED STATES PATENTS

| | | | |
|---|---|---|---|
| 3,176,269 | 3/1965 | Croad | 340—146.1 |
| 3,191,013 | 6/1965 | Reader | 235—164 |
| 3,243,580 | 3/1966 | Welsh | 235—61.11 |

MALCOLM A. MORRISON, *Primary Examiner.*

K. MILDE, *Assistant Examiner.*